United States Patent
Takahashi et al.

(10) Patent No.: US 9,823,094 B2
(45) Date of Patent: Nov. 21, 2017

(54) ROTATION DETECTION DEVICE AND BEARING UNIT EQUIPPED WITH ROTATION DETECTION DEVICE

(71) Applicant: NTN CORPORATION, Osaka (JP)

(72) Inventors: Toru Takahashi, Iwata (JP); Kentaro Nishikawa, Iwata (JP)

(73) Assignee: NTN CORPORATION, Osaka (JP)

( * ) Notice: Subject to any disclaimer, the term of this patent is extended or adjusted under 35 U.S.C. 154(b) by 74 days.

(21) Appl. No.: 15/001,856

(22) Filed: Jan. 20, 2016

(65) Prior Publication Data

US 2016/0138942 A1 May 19, 2016

Related U.S. Application Data

(63) Continuation of application No. PCT/JP2014/069536, filed on Jul. 24, 2014.

(30) Foreign Application Priority Data

Jul. 26, 2013 (JP) .................................. 2013-155409

(51) Int. Cl.
G01R 33/025 (2006.01)
G01P 3/481 (2006.01)
(Continued)

(52) U.S. Cl.
CPC ........... *G01D 5/2449* (2013.01); *G01D 5/145* (2013.01); *G01D 5/249* (2013.01); *G01D 5/2448* (2013.01)

(58) Field of Classification Search
CPC .............................. G01D 5/145; G01D 5/2448
(Continued)

(56) References Cited

U.S. PATENT DOCUMENTS 7,047,145 B2   5/2006 Ishizuka et al.
7,825,653 B2 * 11/2010 Ueno .................. B60B 27/0005
                                                             324/174
(Continued)

FOREIGN PATENT DOCUMENTS

CN       1576850 A    2/2005
CN     101131329 A    2/2008
(Continued)

OTHER PUBLICATIONS

International Search Report dated Oct. 28, 2014 in corresponding International Application No. PCT/JP2014/069536.
(Continued)

*Primary Examiner* — Reena Aurora

(57) ABSTRACT

The rotation detection device includes: an encoder having to-be-detected patterns cyclically arranged in the circumferential direction; and a sensor configured to detect the to-be-detected patterns to generate pulses. The device further includes a reference pattern storage unit, a phase difference detection unit, and an error correction unit. The reference pattern storage unit measures pitch errors in the to-be-detected patterns prior to operation and stores the pitch errors as a reference pattern Pref. The phase difference detection unit determines a pitch error pattern Pm corresponding to one rotation of the to-be-detected patterns from rotation signals representing a plurality of rotations detected during operation, and performs comparison with a reference pattern Pref to determine a relative phase difference φ. Based on the phase difference φ obtained by the phase difference detection unit, the error correction unit corrects errors included in the rotation signals detected by the sensor.

10 Claims, 13 Drawing Sheets

(51) Int. Cl.
*G01D 5/244* (2006.01)
*G01D 5/14* (2006.01)
*G01D 5/249* (2006.01)

(58) Field of Classification Search
USPC ........................................ 324/207.12, 207.25
See application file for complete search history.

(56) References Cited

U.S. PATENT DOCUMENTS

| | | | |
|---|---|---|---|
| 8,669,728 | B2 | 3/2014 | Hsu et al. |
| 8,803,510 | B2 * | 8/2014 | Takahashi ............. F16C 41/007 |
| | | | 324/207.13 |
| 2005/0033539 | A1 | 2/2005 | Ishizuka et al. |
| 2009/0259918 | A1 | 10/2009 | Sugie et al. |
| 2011/0320154 | A1 | 12/2011 | Wakizaka et al. |
| 2013/0181644 | A1 | 7/2013 | Hsu et al. |

FOREIGN PATENT DOCUMENTS

| | | |
|---|---|---|
| CN | 102636107 A | 8/2012 |
| JP | 8-128855 | 5/1996 |
| JP | 2002-311040 | 10/2002 |
| JP | 2008-249574 | 10/2008 |
| JP | 2011-64459 | 3/2011 |
| JP | 2012-137310 | 7/2012 |
| WO | WO 2007/055092 A1 | 5/2007 |

OTHER PUBLICATIONS

International Preliminary Report on Patentability dated Feb. 4, 2016 in corresponding International Patent Application No. PCT/JP2014/069536.

Extended European Search Report dated Feb. 2, 2017 in corresponding European Patent Application No. 14829085.1.

Chinese Office Action dated Nov. 1, 2016 in corresponding Chinese Patent Application No. 201480041330.3.

\* cited by examiner

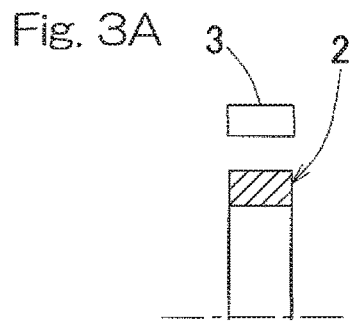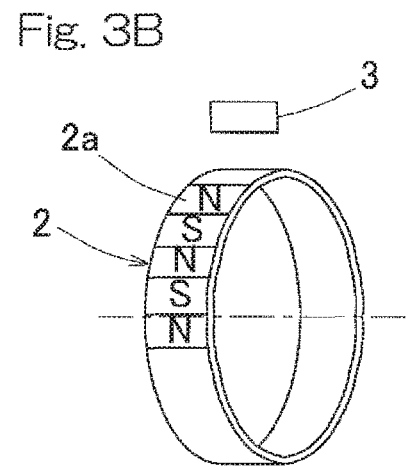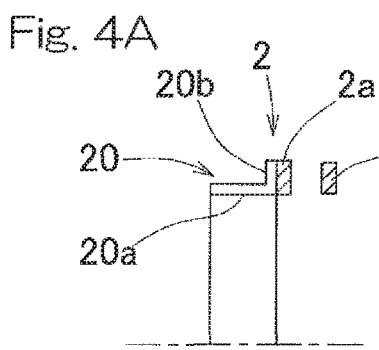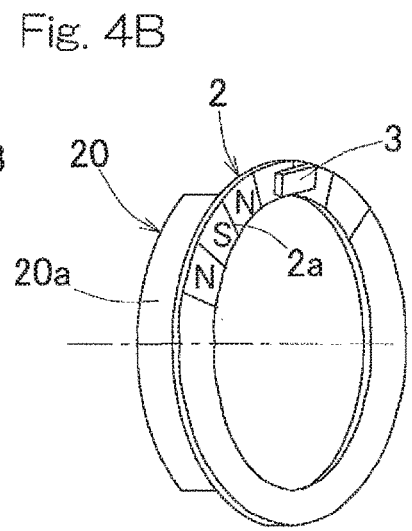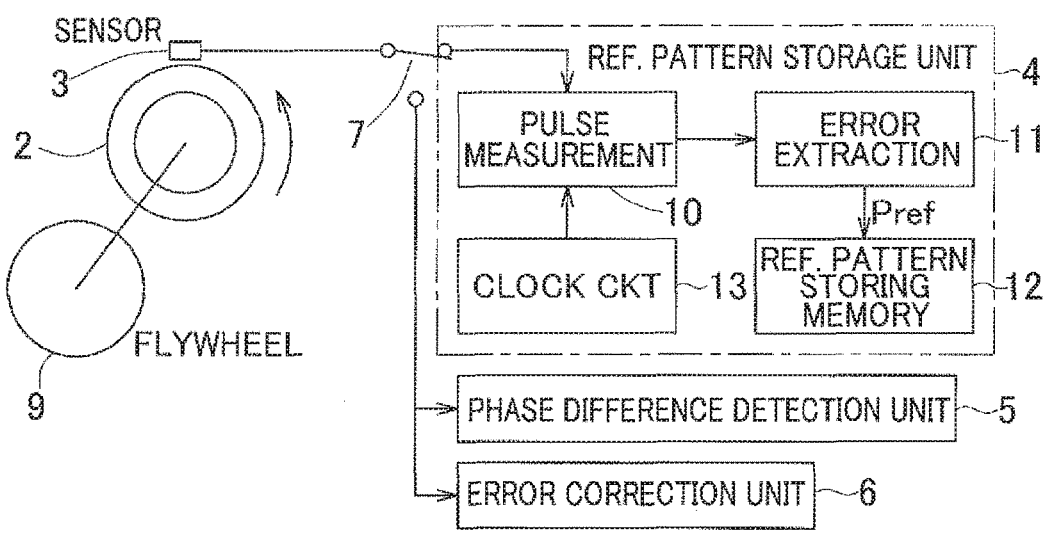

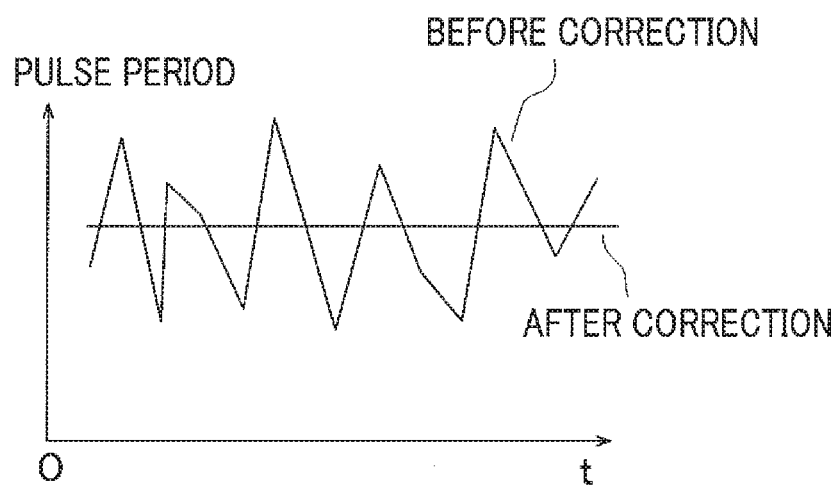

ROTATION DETECTION DEVICE AND BEARING UNIT EQUIPPED WITH ROTATION DETECTION DEVICE

CROSS REFERENCE TO THE RELATED APPLICATION

This application is a continuation application, under 35 U.S.C. §111(a), of international application No. PCT/JP2014/069536, filed Jul. 24, 2014, which claims priority to Japanese patent application No. 2013-155409, filed Jul. 26, 2013, the disclosure of which are incorporated by reference in their entirety into this application.

BACKGROUND OF THE INVENTION

Field of the Invention

The present invention relates to a rotation detection device to be used in rotation angle detection and rotational speed detection in various types of apparatuses, and relates to a rotation detection device-equipped bearing unit having the rotation detection device incorporated therein.

Description of Related Art

As conventional examples of this type of rotation detection device, there have been presented speed detectors that have a function of correcting a duty ratio or a phase shift in an output signal of an encoder by use of a correction amount stored in advance (Patent Documents 1 and 2, for example).

As another conventional example, there has also been presented a rotation detection device that outputs a pulse obtained by interpolating a reference signal of an encoder and that includes correction unit for correcting an error included in an interpolated output by use of identification information of the interpolation pulse (Patent Document 3, for example). FIG. 16 is a graph showing the comparison between the pulse period of the interpolation pulse obtained through error correction and the pulse period before the correction is performed.

RELATED DOCUMENT

Patent Document

[Patent Document 1] JP Laid-Open Patent Publication No. H08-128855
[Patent Document 2] JP Laid-Open Patent Publication No. 2002-311040
[Patent Document 3] JP Laid-Open Patent Publication No. 2008-249574

SUMMARY OF THE INVENTION

As shown in Patent Documents 1 to 3, in the case of a rotation detection device in which errors included in pulse outputs of an encoder are corrected by use of a correction amount set in advance, when the phase error in an A phase output and a B phase output different from each other by 90° is to be corrected, four states are identified based on the states of the respective signals, whereby corrections can be made respectively.

As shown in Patent Document 3, in the case where an interpolating circuit having a higher resolution is used, by adding a pulse identification signal by use of the interpolating circuit, correction of each pulse can be realized.

Meanwhile, an actual encoder output includes errors that occur in association with one rotation of the shaft, such as, for example, magnetization pitch errors regarding the magnetic encoder, pitch errors due to deformation or misalignment in mounting the encoder, and the like. In order to increase accuracy, such errors also need to be corrected.

However, even if an error pattern corresponding to one rotation is stored in order to correct such errors, if a rotational position serving as the reference for the error pattern is not known, correction cannot be made. Thus, a Z phase signal or the like serving as the reference needs to be separately provided. In order to output the Z phase signal, an additional sensor or a special encoder is needed, which poses a problem of increased mounting space or increased mounting costs.

When the Z phase signal is to be provided, it is necessary to prevent the positional relationship between the Z phase signal and a rotation pulse signal from being shifted. This requires mounting accuracy and also hinders provision thereof in a simple manner.

For these reasons, there is a demand for a rotation detection device that can detect the rotational speed and the rotational position with high accuracy, without adding a reference sensor as much as possible.

An object of the present invention is to provide a rotation detection device that can detect the rotational speed and the rotational position with high accuracy, without adding a reference sensor, and to provide a rotation detection device-equipped bearing having the rotation detection device incorporated therein.

A rotation detection device according to the present invention includes: an encoder 2 rotatably provided and having a plurality of to-be-detected patterns cyclically arranged in a circumferential direction; a sensor 3 configured to detect the to-be-detected patterns of the encoder 2 to generate a pulse signal; a reference pattern storage unit 4 configured to measure pitch errors included in the to-be-detected patterns prior to operation and to store the pitch errors therein as a reference pattern Pref; a phase difference detection unit 5 configured to determine a pitch error pattern corresponding to one rotation of the to-be-detected patterns from rotation signals representing a plurality of rotations detected by the sensor 3 during operation, the phase difference detection unit configured to compare the pitch error pattern with the reference pattern to determine a relative phase difference; and an error correction unit 6 configured to, based on the phase difference determined by the phase difference detection unit 5, correct errors included in the rotation signals detected by the sensor 3.

In the rotation detection device configured as above, the following processing is performed.

Prior to operation, the reference pattern storage unit 4 measures pitch errors corresponding to one rotation that are included in the to-be-detected patterns of the encoder 2, normalizes the obtained data by use of an average value, for example, and stores therein in advance as a reference pattern Pref. Preferably, the reference pattern Pref is measured with the encoder 2 incorporated, and is stored as including errors due to misalignment or deformation.

During operation, first, the phase difference detection unit 5 performs phase difference detection processing in the following steps (the sensor 3 is to detect N rotation pulses per rotation of the encoder 2).

(1) Measuring, in a state where the encoder 2 is rotating at a certain level of speed, the periods T(1) to T(N) of rotation pulses per rotation, for several to several tens of rotations.

(2) Calculating the average period of rotation pulses from the data of the measured pulse periods corresponding to the plurality of rotations, performing normalization as in the case of the reference pattern Pref, and defining the obtained result as a pitch error pattern Pm which is an average period variation pattern corresponding to one rotation.

(3) Calculating a normalization correlation value between the obtained pitch error pattern Pm and the reference pattern Pref, while shifting data of the pitch error pattern Pm and data of the reference pattern Pref, and calculating a position (in other words, phase) where the correlation value becomes highest, as a relative phase difference φ of the pitch error pattern Pm relative to the reference pattern Pref.

After the phase difference φ of the pitch error pattern Pm relative to the reference pattern Pref has been obtained, the error correction unit 6 performs the following error correction process.

Data is shifted by the obtained phase difference φ, and in a state where the phases are matched with each other, correction is performed by the following expression using the reference pattern Pref. When the period of the inputted rotation pulse having a pulse number(i) is assumed as P(i), $$Pout(i)=P(i)/Pref(i+\phi)$$

is used to obtain a pulse period Pout(i) for which a fixed error pattern amount has been corrected. For several rotations before the first phase difference φ is obtained, errors are not corrected. However, after that, pitch errors associated with the encoder 2 are corrected. Accordingly, the rotational position/rotational speed can be detected with higher accuracy. If the phase difference φ relative to the reference pattern Pref is obtained, a rotational position can be detected. Therefore, outputting information regarding the rotation angle position, such as outputting a Z phase signal at a constant rotational phase, can also be performed.

As described above, the rotation detection device is configured such that: prior to operation, the reference pattern storage unit 4 measures pitch errors included in the to-be-detected patterns of the encoder 2 and stores the pitch errors as the reference pattern Pref; and during operation, the phase difference detection unit 5 obtains the pitch error pattern Pm corresponding to one rotation of the to-be-detected patterns from rotation signals representing a plurality of rotations detected by the sensor 3 and compares the pitch error pattern Pm with the reference pattern Pref to obtain a relative phase difference φ, and further, the error correction unit 6 corrects errors included in the rotation signals detected by the sensor 3 based on the phase difference φ. Therefore, it is possible to detect the rotational speed and the rotational position with high accuracy, without adding a reference sensor.

In one embodiment of the present invention, each of the reference pattern and the pitch error pattern may be obtained through normalization by use of an average value.

It should be noted that "normalization by use of an average value" specifically means the following processing: with respect to the pitch error pattern Pm corresponding to one rotation obtained from averaging the data of the pulse periods corresponding to a plurality of rotations, when the average value of N pieces of data Pm(1) to Pm(N) is assumed as Po, the ratio of Pm to the average value is obtained, thereby obtaining Pr=Pm/Po. Since each of the reference pattern and the pitch error pattern is obtained through normalization by use of an average value, the reference pattern and the pitch error pattern can appropriately indicate the reference and the error, respectively.

In one embodiment of the present invention, the phase difference detection unit 5 may perform correlation calculation while shifting a phase of the reference pattern and a phase of the pitch error pattern relative to each other, to calculate the phase difference.

In this case, the phase difference detection unit 5 may calculate the phase difference by performing correlation calculation in which low frequency components equal to or lower than a predetermined frequency included in the reference pattern and the pitch error pattern are excluded and only high frequency components higher than the low frequency components are used.

In such a case where the rotational body is misaligned and is swinging, or in such a case where the load changes in synchronization with rotation, a large pattern having low frequency components appearing once or twice in one rotation may be superimposed. If the processing is performed at this time, the correlation value is influenced by the low frequency components, and the phase difference may be erroneously detected. By excluding the low frequency components, such erroneous detection of the phase difference can be avoided.

In one embodiment of the present invention, the error correction unit 6 may include a pulse counter configured to output, by use of the phase difference obtained by the phase difference detection unit 5, a Z phase signal as a reference position signal when a current rotation angle of the encoder has become a specific angle. By outputting the Z phase signal as the reference position signal, the absolute angle can be calculated.

In one embodiment of the present invention, when the phase difference has been obtained, the error correction unit 6 may output a status signal indicating that the phase difference has been obtained. By the status signal being outputted, control using this rotation detection device is facilitated.

In this case, the Z phase signal may be outputted as the status signal, and the Z phase signal may not be outputted when the phase difference has not been obtained. Since the Z phase signal is used as the status signal, a dedicated status signal is not necessary.

In one embodiment of the present invention, the error correction unit 6 may also calculate a corrected rotational speed value of the encoder, based on the phase difference and the reference pattern.

In one embodiment of the present invention, the phase difference detection unit 5 may perform normalization using an average period of rotation signals detected by the sensor 3 to obtain the pitch error pattern corresponding to one rotation, calculate a normalization correlation value between the pitch error pattern and the reference pattern while shifting data of the pitch error pattern and data of the reference pattern relative to each other, and determine that the phase difference is obtained if the normalization correlation value is greater than a predetermined threshold value. By performing normalization correlation, the rotational phase can be stably detected even if there is influence of disturbance.

A rotation detection device-equipped bearing unit according to the present invention includes a bearing and the rotation detection device having any of the above configurations of the present invention mounted to the bearing.

According to this configuration, it is possible to avoid influence of change in signals due to variation and the like of the mounting position of the sensor and deformation and the like of the mounted members, and to stably detect the rotational speed and the rotational position with high accuracy.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 3A is a fragmentary cross-sectional view showing one configuration example of an encoder in the rotation detection device;

FIG. 3B is a perspective view of the encoder;

FIG. 4A is a fragmentary cross-sectional view showing another configuration example of the encoder in the rotation detection device, FIG. 4B is a perspective view of the encoder;

FIG. 5 is a block diagram showing another example in a state during initial setting of the rotation detection device;

FIG. 16 is a graph showing the comparison between the pulse period of an interpolation pulse obtained through error correction and the pulse period before the correction is performed in a conventional example.

DESCRIPTION OF EMBODIMENTS

Figure 1:
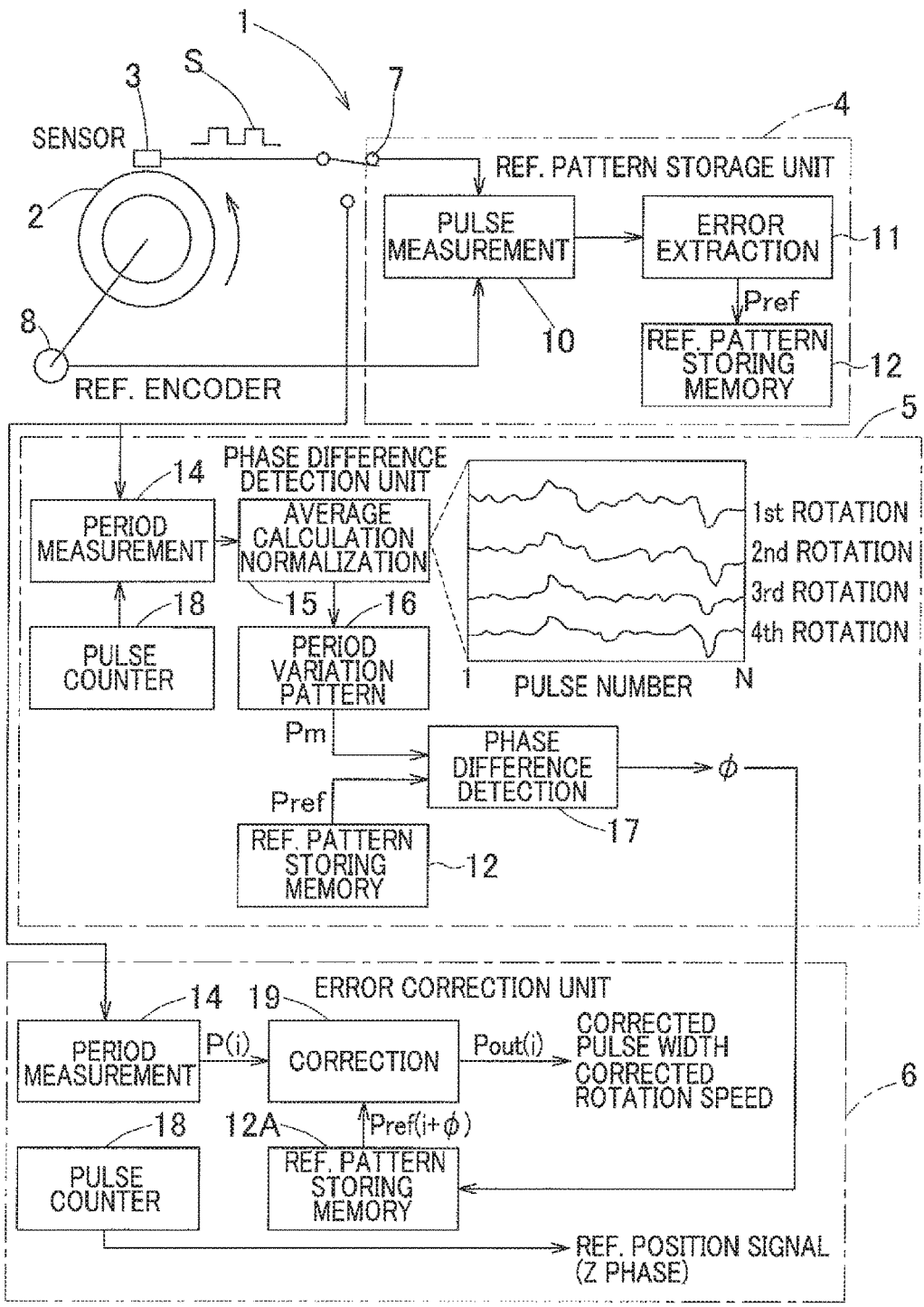
FIG. 1 is a block diagram showing a conceptual configuration of a rotation detection device in a state during initial setting according to one embodiment of the present invention.

One embodiment of the present invention will be described with reference to the drawings. FIG. 1 is a block diagram showing a conceptual configuration of a rotation detection device according to this embodiment. This rotation detection device 1 includes: a ring-shaped encoder 2 rotatably provided and having a plurality of to-be-detected patterns cyclically arranged in the circumferential direction thereof; a sensor 3 which detects the to-be-detected patterns of the encoder 2 to generate a pulse signal S as a rotation signal; a reference pattern storage unit 4; a phase difference detection unit 5, and an error correction unit 6. The reference pattern storage unit 4 measures, during initial setting prior to operation, pitch errors corresponding to one rotation that are included in the to-be-detected patterns, and stores in advance the pitch errors as a reference pattern Pref. The phase difference detection unit 5 determines a pitch error pattern Pm corresponding to one rotation of the to-be-detected patterns from rotation signals representing a plurality of rotations detected by the sensor 3 during operation, and compares this pitch error pattern Pm with the reference pattern Pref to determine a relative phase difference $\phi$. The error correction unit 6 corrects errors included in the rotation signals detected by the sensor 3, based on the phase difference $\phi$ determined by the phase difference detection unit 5.

Figure 2:
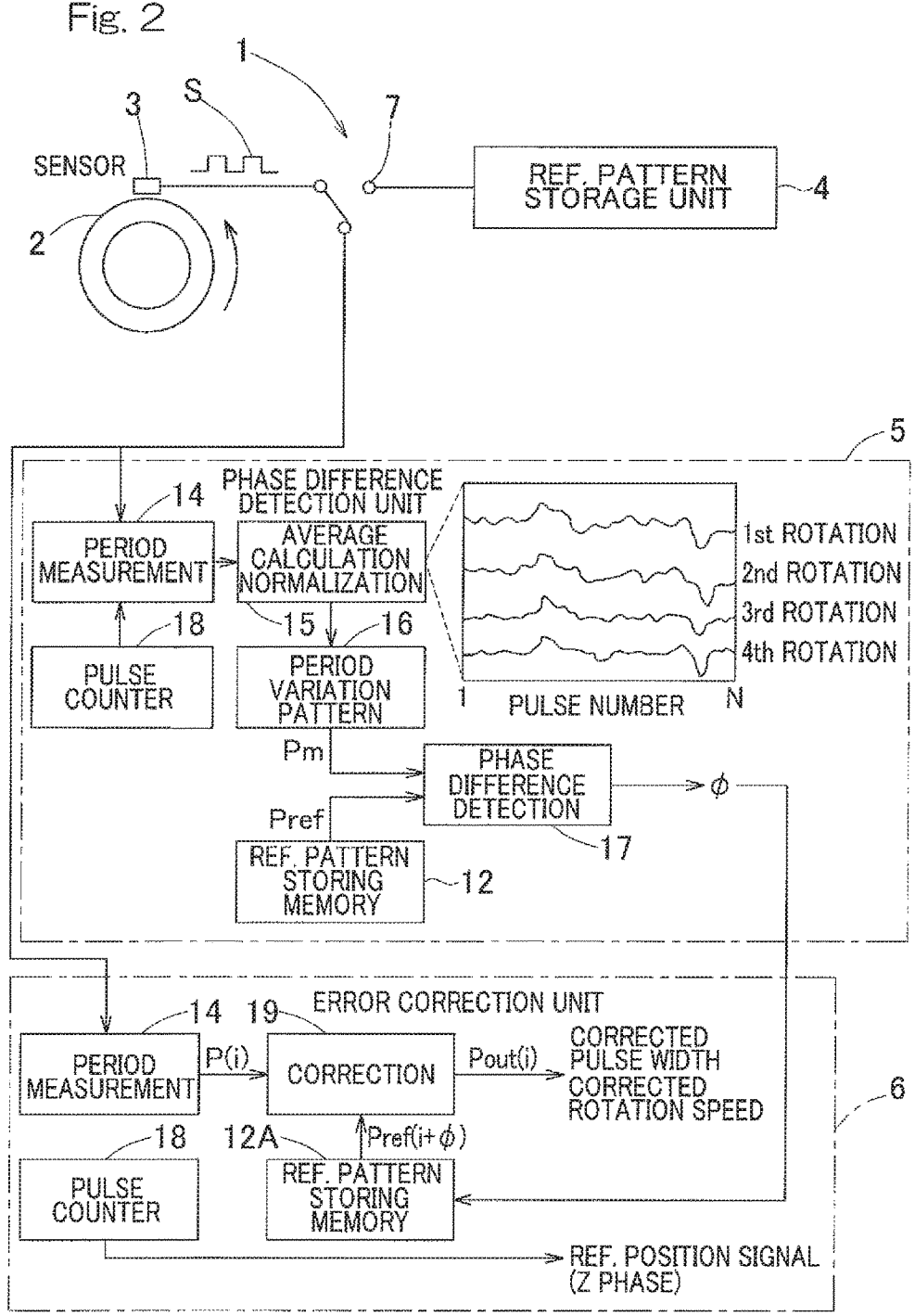
FIG. 2 is a block diagram showing a driving state of the rotation detection device.

A switch 7 is interposed between the sensor 3, and the reference pattern storage unit 4, the phase difference detection unit 5 and the error correction unit 6. During the initial setting prior to operation, by the switch 7 being switched, the sensor 3 is connected to the reference pattern storage unit 4 as shown in FIG. 1. Meanwhile, during operation when the rotation detection device 1 is mounted on a rotational body such as a bearing, the sensor 3 is connected to the phase difference detection unit 5 and the error correction unit 6 as shown in FIG. 2. The switch 7 may be a semiconductor switching element or a contact type switch, or may be implemented as a conceptual one, such as, for example, software that switches processing.

As shown in the fragmentary cross-sectional view in FIG. 3A and the perspective view in FIG. 3B, for example, the encoder 2 is implemented as a ring-shaped magnetic encoder in which a plurality of magnetic pole pairs 2a as the to-be-detected patterns are cyclically arranged and magnetized in the circumferential direction on a peripheral surface of the encoder 2. The encoder 2 is fixed, in a concentric manner, to a rotational body to be detected not shown so that the encoder 2 is rotatably arranged. In this example, the sensor 3 is in the form of a magnetic sensor which detects the magnetic poles N, S of the encoder 2, and is disposed so as to face the peripheral surface of the encoder 2, on the outer peripheral side, for example.

The configuration example of the encoder 2 shown in FIGS. 3A and 3B is of a radial type in which the magnetic pole pairs 2a are magnetized on the peripheral surface of the encoder 2, but the encoder 2 may be of an axial type shown in the fragmentary cross-sectional view in FIG. 4A and the perspective view in FIG. 4B. In the configuration example shown in FIGS. 4A and 4B, a plurality of magnetic pole pairs 2a are cyclically arranged and magnetized in the circumferential direction on a side face of a flange portion 20b which extends from one end, toward the outer peripheral side, of a cylindrical portion 20a of a ring-shaped back metal 20 having an L-shaped cross section, for example. By fitting the cylindrical portion 20a of the back metal 20 to the outer peripheral surface of a rotational body such as a rotating shaft, the encoder 2 is mounted to the rotational body. In this case, the sensor 3 is disposed in the axial direction so as to face the magnetized surface of the encoder 2.

In the initial setting prior to operation, as shown in FIG. 1, each pulse signal S being a rotation signal detected by the sensor 3 is inputted to the reference pattern storage unit 4 via the switch 7. In this example, during the initial setting, a reference encoder 8 which rotates in synchronization with the encoder 2 is mounted thereto. The reference pattern storage unit 4 includes a pulse measurement section 10, an error extraction section 11, and a reference pattern storing memory 12. The reference pattern storage unit 4 measures, by means of the pulse measurement section 10, the period of each pulse signal S corresponding to one rotation that is outputted from the sensor 3 and that corresponds to the to-be-detected patterns of the encoder 2; extracts, by means of the error extraction section 11, a pitch error pattern Perr of the to-be-detected patterns from measurement values; normalizes the obtained data by use of an average value; and stores the resultant data in the reference pattern storing memory 12 as the reference pattern Pref in advance. In order to reduce the influence of noise in the measurement, it is preferable to perform the measurement for several to several tens of rotations, to obtain the average value from the measurement values of the pulse periods, thereby to extract the pitch error pattern Perr.

"To normalize by use of the average value" specifically means the following processing: with respect to the pitch error pattern Perr corresponding to one rotation extracted from the data of the pulse periods, when the average value of N pieces of data Perr(1) to Perr(N) is assumed as Perro, the ratio of Perr relative to the average value is obtained, thereby obtaining Pref=Perr/Perro.

The pulse measurement section 10 measures the period of each pulse signal S based on a signal obtained from the reference encoder 8. Preferably, the reference pattern Pref is measured with the encoder 2 being incorporated, and is stored as including errors due to misalignment or deformation.

In the initial setting, instead of mounting the reference encoder 8 which rotates in synchronization with the encoder 2 as shown in FIG. 1, a flywheel 9 having a large inertia is coupled, in a concentric manner, to the encoder 2 as shown in FIG. 5. In this state, if the encoder 2 is rotated and the pulse period is measured by the pulse measurement section 10 as described above, a substantially constant rotational speed or a rotational speed having a substantially constant speed change rate is realized. Thus, the pitch errors of the to-be-detected patterns can be extracted in the error extraction section 11 in a similar manner. In this case, the pulse measurement section 10 can measure the pulse period based on a clock signal having a constant period provided from a clock circuit 13.

During the operation in which the rotation detection device 1 is mounted to a rotational body such as a bearing to be detected, by the switch 7 being switched as shown in FIG. 2, the sensor 3 is connected to the phase difference detection unit 5 and the error correction unit 6. During an initial period of this operation state, the phase difference detection unit 5 obtains a phase difference $\phi$ relative to the reference pattern Pref as described below, by using the characteristic, i.e., peculiar feature, of error components included in rotation signals detected by the sensor 3.

The phase difference detection unit 5 includes a period measurement section 14, an average calculation normalization processing section 15, a period variation pattern storage section 16, a phase difference detection section 17, a pulse counter 18, and a reference pattern storing memory 12. The reference pattern storing memory 12 is used in common by the phase difference detection unit 5 and the reference pattern storage unit 4.

During the initial period of operation of the rotation detection device 1, the phase difference detection unit 5 performs the following processing of detecting the phase difference $\phi$ relative to the reference pattern Pref, by using the characteristic of error components included in rotation signals detected by the sensor 3.

(1) In a state where the encoder 2 is rotating at a certain level of speed, the period measurement section 14 measures the periods P(1) to P(N) of each pulse signal S detected by the sensor 3 per rotation, for several to several tens of rotations. The period measurement section 14 measures the period based on a pulse having a constant period provided from the pulse counter 18. Here, it is assumed that the sensor 3 detects N pulses per rotation.

(2) The average calculation normalization processing section 15 calculates the average period of pulses from the data of the measured pulse periods corresponding to the plurality of rotations, performs normalization as in the case of the reference pattern Pref, and stores the obtained result in the period variation pattern storage section 16, as the pitch error pattern Pm corresponding to one rotation.

(3) The phase difference detection section 17 calculates a normalization correlation value between the pitch error pattern Pm and the reference pattern Pref obtained by the reference pattern storage unit 4, while shifting phase data of the pitch error pattern Pm and phase data of the reference pattern Pref relative to each other, and calculates a position (relative phase difference) $\phi$ where the correlation value becomes highest.

In this processing, the characteristic of the pattern detected by the sensor is extracted by use of data obtained by averaging pulse periods corresponding to several rotations. Thus, when a very slight period variation is included, the phase difference $\phi$ can be detected. Therefore, there is no need to provide the encoder 2 with a large error pattern used for identification of the Z phase, and phase detection can be performed based on a small pitch error or the like that occurs during production. Therefore, it is possible to ensure sufficient pitch accuracy in normal rotation detection and to detect the rotational phase by use of a characteristic error pattern included therein.

However, in the case where the pitch error is too small, or in the case where the encoder 2 is used in a state where pitch variation is uniformly occurring in the rotational direction, there are cases where the phase difference detection cannot be performed in a preferable manner through the above processing. Therefore, preferably, the to-be-detected patterns should be devised so as to allow pattern matching to be well performed in correlation calculation, by suppressing the pitch error in one rotation to be ±0.5% or lower and by allowing the pitch error of +0.5% to appear only in one specific portion or several specific portions.

Further, in the case where the calculated normalization correlation value has exceeded a predetermined threshold value, it may be judged that the phase difference $\phi$ has been normally detected. There also occurs a case where an accurate phase difference $\phi$ cannot be detected due to much noise in the detected pitch error pattern Pm, and thus, preferably, period data collection is continued until it is determined that the phase difference $\phi$ has been normally detected.

In this way, after the phase difference φ has been detected, a normal operation state is established. That is, the above processing performed by the phase difference detection unit 5 corresponds to, when compared to a rotation detection device with the Z phase signal provided, an initial operation in which a Z phase position is sought during initial one rotation, and after the Z phase position is found, the rotational phase enters a known state.

The error correction unit 6 includes the period measurement section 14, a correction processing section 19, a reference pattern storing memory 12A, and the pulse counter 18. The period measurement section 14 and the pulse counter 18 are used in common by the error correction unit 6 and the phase difference detection unit 5. Accordingly, it is to be noted that for convenience of explanation, two period measurement sections 14 and two pulse counters 18 appear in the drawings, but the two period measurement sections 14 are actually implemented as one period measurement section 14, and the two pulse counters 18 are actually implemented as one pulse counter 18.

During normal operation after the phase difference φ relative to the reference pattern Pref has been determined, the error correction unit 6 performs an error correction process in the following steps.

When the period of a pulse signal S having a pulse number(i) is assumed as P(i), the reference pattern storing memory 12A shifts, by the phase difference φ obtained by the phase difference detection unit 5, the period of the reference pattern Pref obtained by the reference pattern storage unit 4 to cause their phases matched with each other, and stores the resultant pattern as a reference pattern Pref (i+φ).

After such phase matching performed, the period P(i) of the pulse signal S having the pulse number(i) inputted via the period measurement section 14 is calculated, in the correction processing section 19, into a pulse period Pout(i) for which a fixed error pattern amount has been corrected, by the following expression $$Pout(i) = P(i)/Pref(i+\phi) \quad (1)$$

using the reference pattern Pref(i+φ) stored in the reference pattern storing memory 12A. By using this corrected pulse period Pout(i), an accurate rotational position and rotational speed corresponding to the pulse signal S having the pulse number(i) can be obtained.

It should be noted that, as the reference pattern storing memory 12A, the reference pattern storing memory 12 in the reference pattern storage unit 4 and the phase difference detection unit 5 may be used in common.

In the above processing during operation, for several rotations before the first phase difference φ is obtained, errors are not corrected. However, after the phase difference φ is detected, errors associated with the encoder 2 are corrected. Thus, a corrected pulse width (from which an accurate rotation angle can be obtained) and a corrected rotational speed calculated by use of the corrected pulse width can be obtained. Accordingly, the rotation angle/rotational speed can be detected with higher accuracy.

After the phase difference φ relative to the reference pattern Pref is determined, the rotational position based on the encoder 2 can be detected. Therefore, after the phase difference φ is detected, a reference position signal regarding the angle position can also be outputted.

The error correction unit 6 is configured to output a status signal indicating that the phase difference φ has been determined. In this example, as the status signal, a reference position signal (Z phase signal) is outputted from the pulse counter 18. When the phase difference φ has not been obtained, the Z phase signal is not outputted. With this configuration, when the Z phase signal is outputted after several rotations, it is indicated that the reference position has been found. Thus, after that, the absolute angle can be calculated, which advantageously allows usage similar to that of a normal Z phase-provided sensor.

Figure 6:
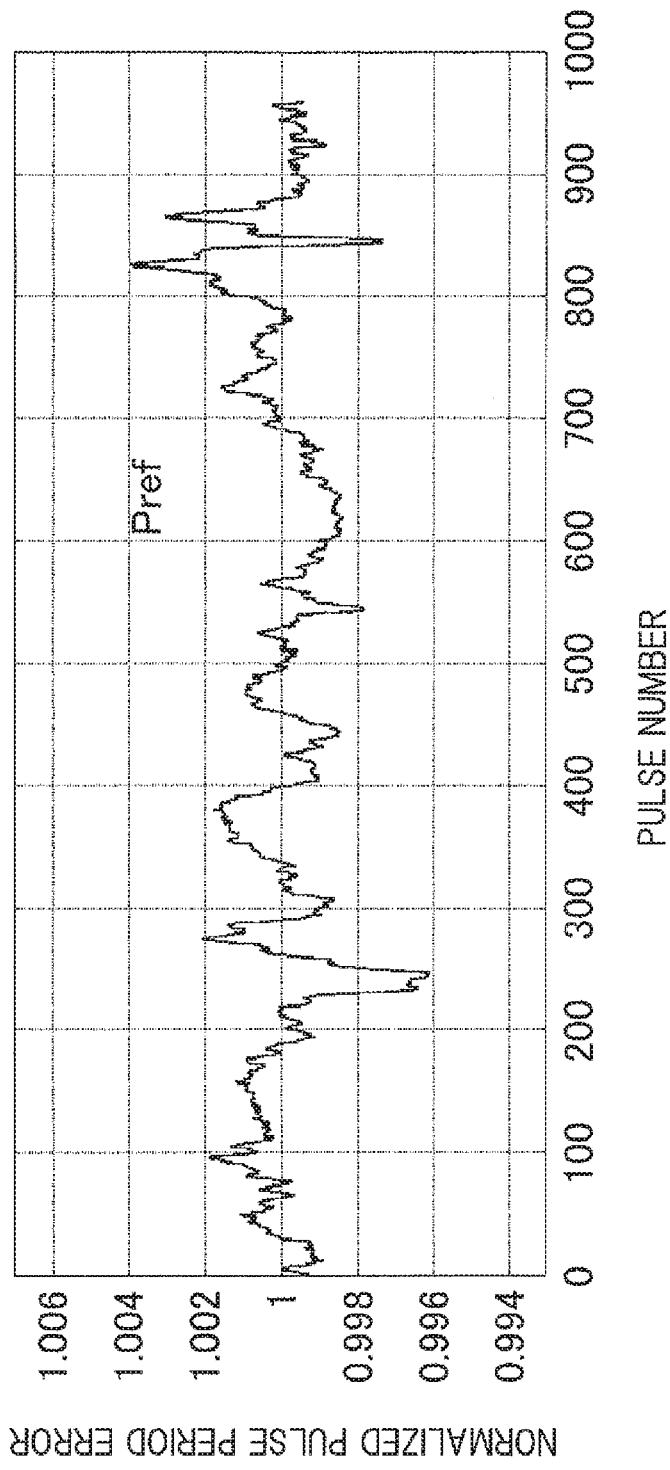
FIG. 6 is a graph showing one example of a reference pattern Pref detected during initial setting of the rotation detection device.
Figure 7:
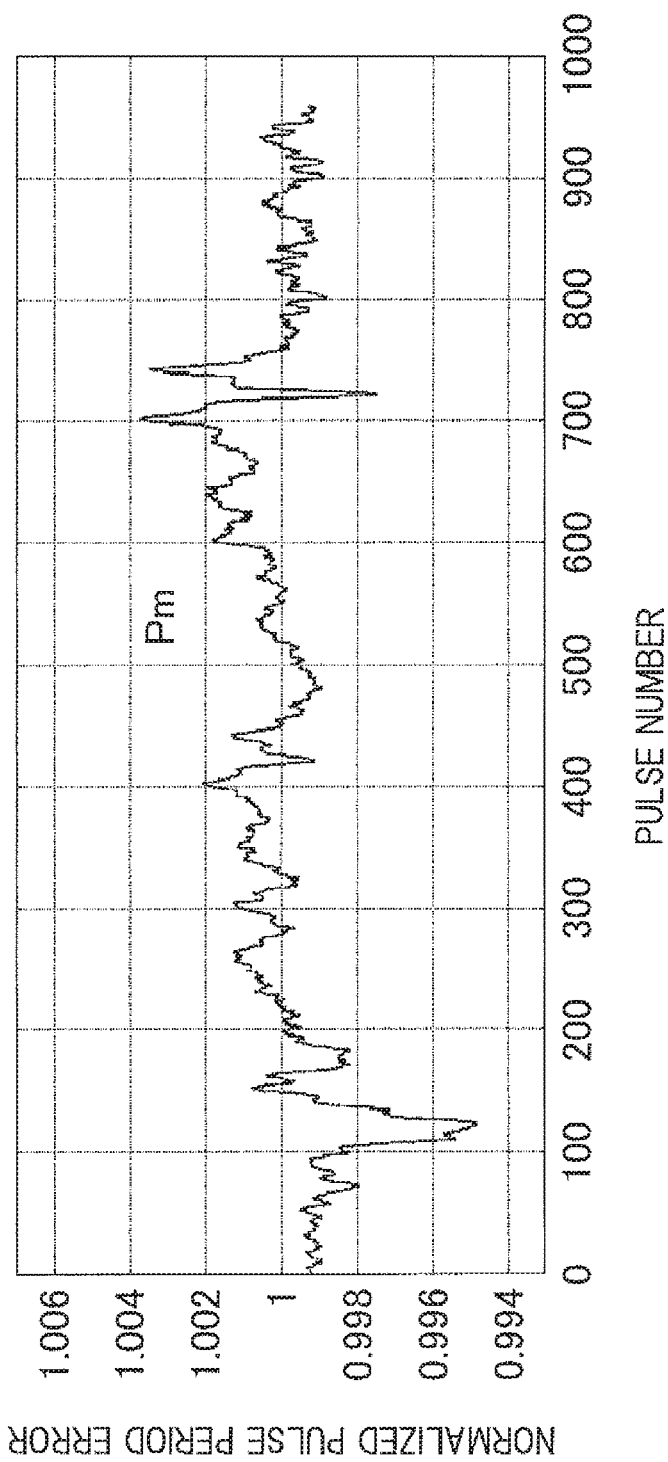
FIG. 7 is a graph showing one example of a pitch error pattern Pm detected during operation of the rotation detection device.
Figure 8:
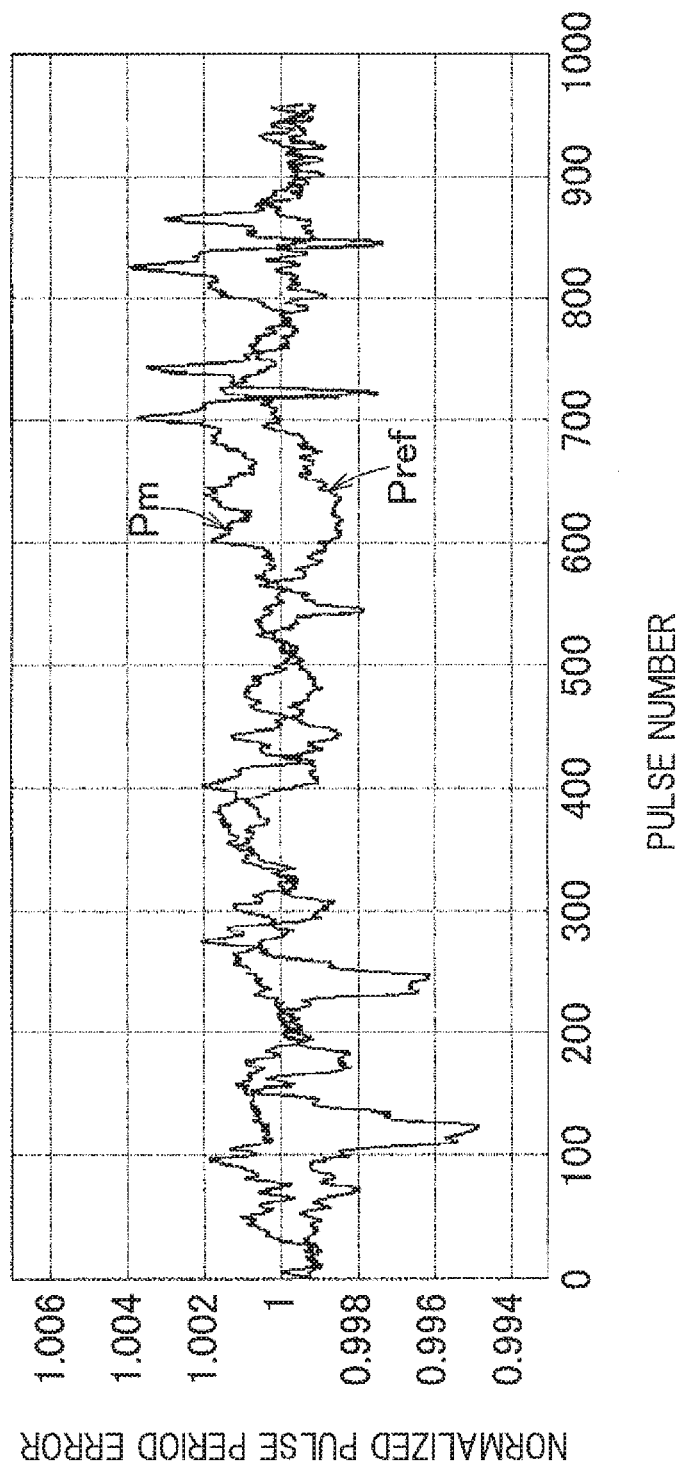
FIG. 8 is a graph showing the reference pattern Pref and the pitch error pattern Pm in a superposed manner.

FIG. 6 shows an example of the reference pattern Pref. In FIG. 6 and FIGS. 7 to 9 described later, the horizontal axis represents rotation pulse number, and the vertical axis represents normalized pulse period error expressed in the ratio relative to the average pulse period. Near the pulse numbers 250 and 850, characteristic error patterns are observed. FIG. 7 shows an example of the pitch error pattern Pm obtained from data corresponding to 20 rotations. The phase in FIG. 7 is shifted from that of the reference pattern Pref in FIG. 6, but it is seen that the characteristics of error patterns are similar to each other. FIG. 8 shows the reference pattern Pref in FIG. 6 and the pitch error pattern Pm in FIG. 7 in a superposed manner.

Figure 9:
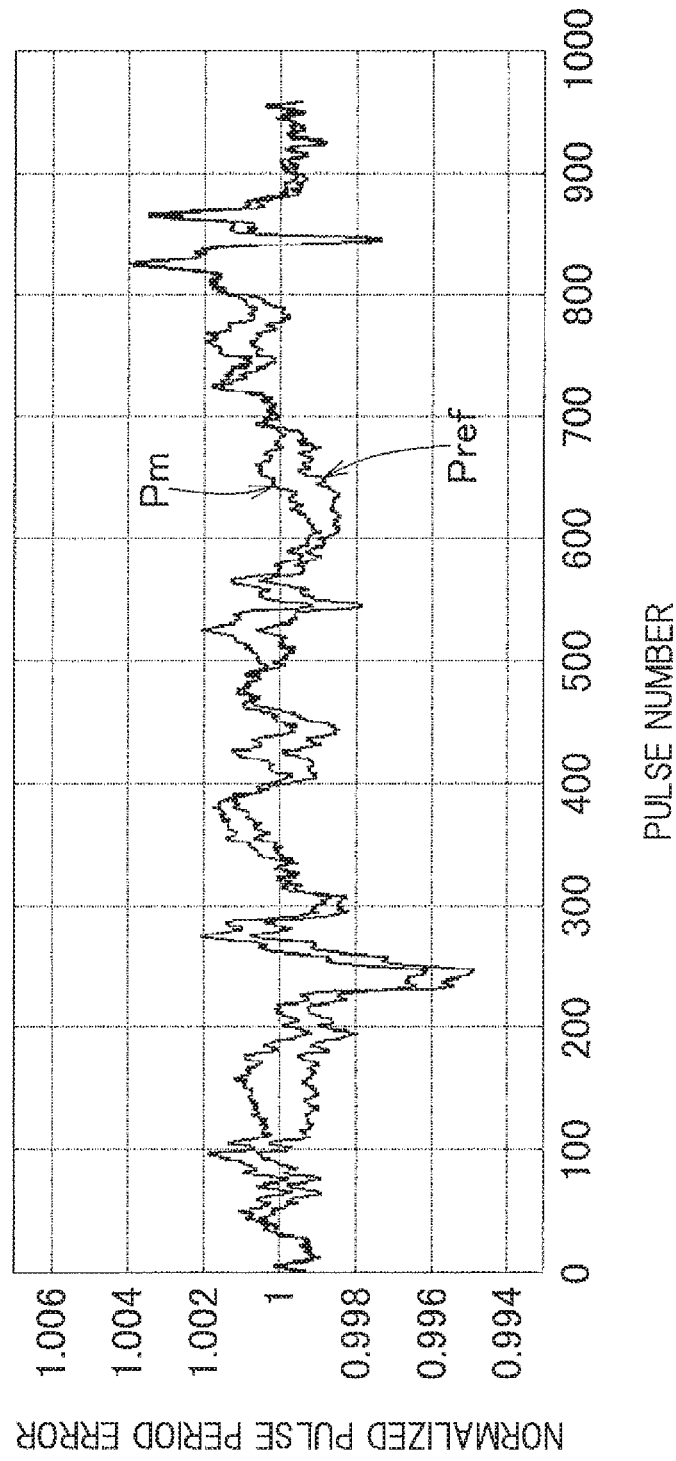
FIG. 9 is a graph showing a state in which the phase of the pitch error pattern Pm is matched with the reference pattern Pref.

In the state shown in FIG. 8, the positions of the characteristic patterns are shifted from each other. However, by shifting the pitch error pattern Pm rightward, it is possible to place the pitch error pattern Pm so as to overlap the reference pattern Pref. That is, in the process of determining the correlation value while shifting the pitch error pattern Pm rightward, the correlation value is maximized at the position where the pitch error pattern Pm overlaps the reference pattern Pref most, and thus, this position can be determined as the phase difference φ. If the pitch error pattern Pm and the reference pattern Pref are plotted at the position where the pitch error pattern Pm has been shifted by the obtained phase difference φ, the graph shown in FIG. 9 is obtained.

Although not obviously observed in this data, in such a case where the rotational body is misaligned and is swinging, a large pattern having low frequency components appearing once or twice in one rotation may be superimposed. If the same processing as above is performed at this time, the correlation value is influenced by the low frequency components, and the phase difference φ may be erroneously detected. In order to assuredly detect the phase difference φ based on characteristic errors associated with the sensor 3, it is preferable to cut low frequency components equal to or lower than a predetermined frequency, and to perform correlation calculation by use of high frequency components having higher frequencies than this low frequency component.

The low frequency components to be cut are frequency components appearing 15 times or fewer per rotation in the case of wheel usage, for example. This value needs to be appropriately selected in accordance with usage. For example, for usage in an eight-pole motor, since it is highly likely that synchronization components superimpose four times per rotation, it is preferable to set the value to equal to or lower than about 4 to 8. In the case of a 12-tooth gear rotating, it is preferable to set the value to equal to or lower than 12, similarly.

Effects of the rotation detection device 1 will be listed below.

Errors included in the to-be-detected patterns of the encoder 2 are corrected based on an error measurement value measured in advance. Thus, in the case where the encoder 2 is a magnetic encoder, for example, the rotational position and the rotational speed can be measured with higher accuracy, without being influenced by magnetization error and the like.

In the case of a configuration in which correction is performed in a state where the rotation detection device 1 is incorporated to a bearing, errors due to misalignment or deformation are also corrected. Thus, the rotational position and the rotational speed can be measured with higher accuracy.

The variation pattern (the pitch error pattern Pm) of rotation pulses observed during rotation is detected, and the characteristic thereof is compared with that of the reference pattern Pref, whereby the phase difference φ relative to the reference pattern Pref is detected. Thus, it is not necessary to additionally mount a sensor or an encoder required for a Z phase signal or the like for detecting the phase difference φ. Therefore, it is possible to realize high accuracy rotational position/rotational speed detection in saved space, without increasing the price.

Since the phase difference detection is performed through normalization correlation, even if there is influence of disturbance, the rotational phase can be stably detected.

Even in the application to a sensor signal having a large number of rotation pulses, since the accuracy of the normalization correlation processing described above is high, the phase of the pitch error pattern Pm can be accurately matched to that of the reference pattern Pref, and thus, error correction can be accurately performed.

Without additionally providing a sensor or a structure for detecting the Z phase, it is possible to detect the rotational position and also to correct errors associated with the encoder 2.

As described above, the rotation detection device 1 is configured such that: prior to operation, the reference pattern storage unit 4 measures pitch errors included in the to-be-detected patterns of the encoder 2 and stores the pitch errors as the reference pattern Pref; and during operation, the phase difference detection unit 5 obtains the pitch error pattern Pm corresponding to one rotation of the to-be-detected patterns from rotation signals representing a plurality of rotations detected by the sensor 3 and compares the pitch error pattern Pm with the reference pattern Pref to obtain a relative phase difference φ, and further, the error correction unit 6 corrects errors included in the rotation signals detected by the sensor 3 based on the phase difference φ. Therefore, it is possible to detect the rotational speed and the rotational position with high accuracy, without adding a reference sensor.

Figure 10:
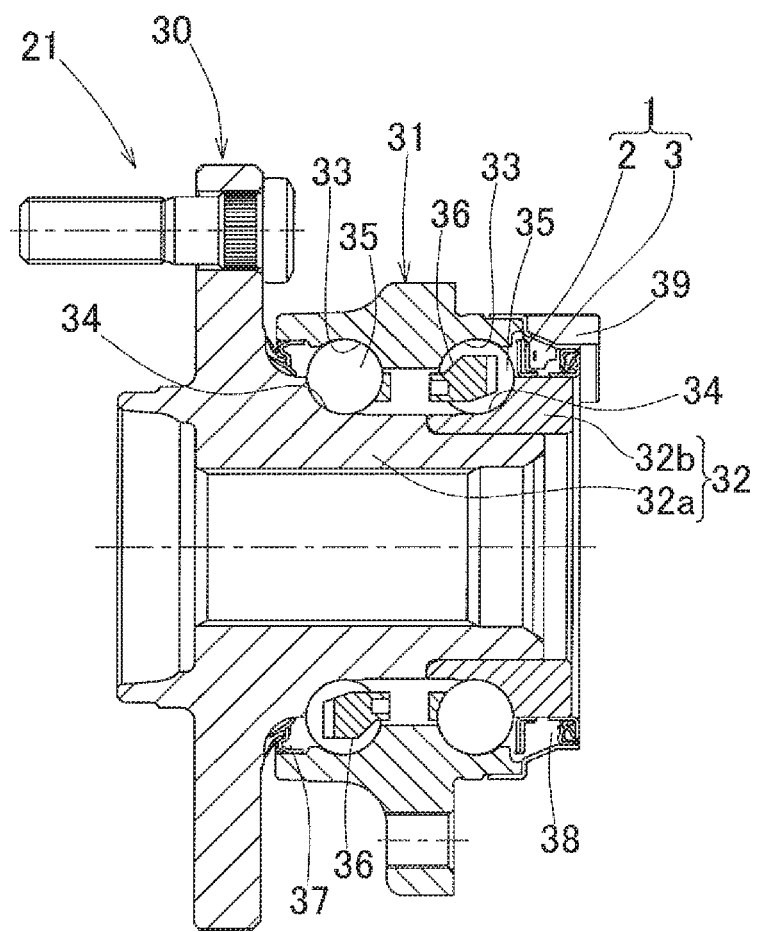
FIG. 10 is a cross-sectional view showing one configuration example of a rotation detection device-equipped bearing unit in which the rotation detection device according to the present invention is mounted.
Figure 11:
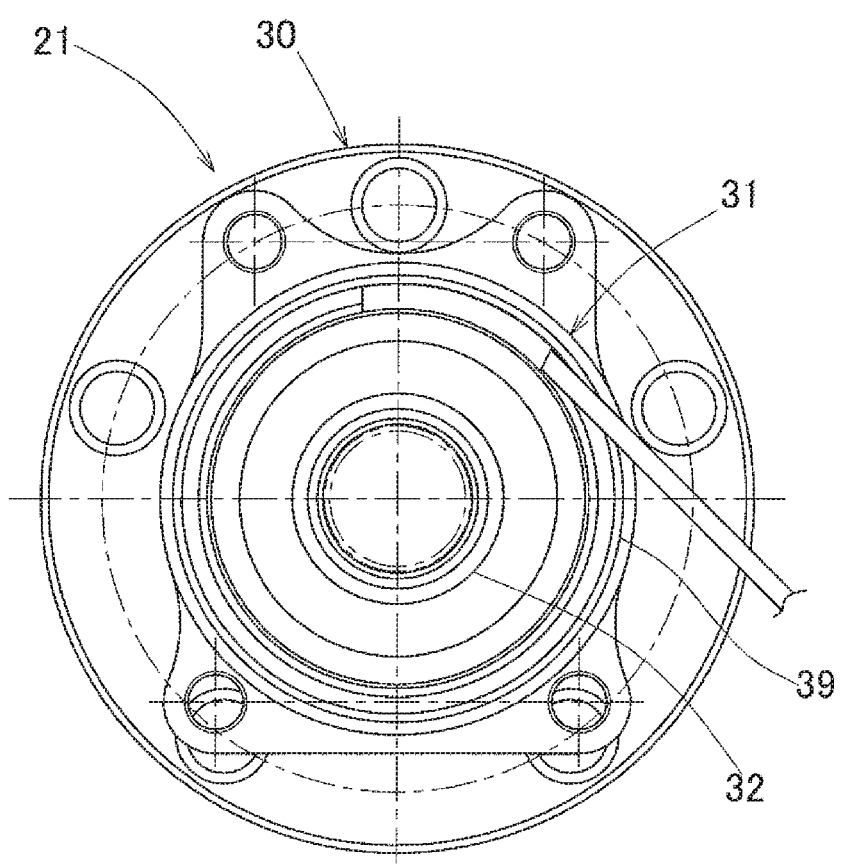
FIG. 11 is a side view of the rotation detection device-equipped bearing unit, viewed from the inboard side.

FIGS. 10 and 11 show one configuration example of a rotation detection device-equipped bearing unit in which the rotation detection device 1 described above is mounted to a bearing for automotive wheel. This rotation detection device-equipped bearing unit 21 is of a third-generation inner ring rotation type in which the rotation detection device 1 of an axial type is mounted to a wheel bearing 30 for supporting a drive wheel.

The wheel bearing 30 includes an outer member 31 having a plurality of rows of rolling surfaces 33 formed on the inner circumferential surface thereof; an inner member 32 having formed thereon rolling surfaces 34 respectively facing the rolling surfaces 33; and a plurality of rows of rolling elements 35 interposed between the rolling surfaces 33 and 34 of the outer member 31 and the inner member 32. The wheel bearing 30 is configured to rotatably support the wheel relative to the body of a vehicle. The wheel bearing 30 is of a double row outward-facing angular contact ball bearing. The rolling elements 35 are each formed as a ball, and are retained by a retainer 36 in each row. The inner member 32 includes a hub ring 32*a* and an inner ring 32*b* fitted to the outer circumferential surface at an inboard side end of the hub ring 32*a*. The rolling surfaces 34 are provided on respective outer circumferential surfaces of the rings 32*a* and 32*b*. Opposite ends of the bearing space between the outer member 31 and the inner member 32 are sealed with seals 37 and 38, respectively. A slinger press-fixed to the outer peripheral surface of the inner member 32, specifically, the outer peripheral surface of the inner ring 32*b*, in the seal 38 at the inboard side end serves as the magnetic encoder 2 of the rotation detection device 1. The sensor 3 of the rotation detection device 1 is disposed so as to face, in the axial direction, a side face where magnetic pole pairs of the magnetic encoder 2 are arranged in the circumferential direction thereof. The sensor 3 is provided through resin molding in a metal case 39 having a ring shape, and fixed to the outer member 31 via the metal case 39.

Thus, in the rotation detection device-equipped bearing unit 21 in which the rotation detection device 1 having the above configuration is mounted to the wheel bearing 30, it is possible to avoid influence of change in signals due to variation and the like of the mounting position of the sensor and deformation and the like of the mounted members, and to stably obtain the rotational speed/rotational position information of the wheel with high accuracy. Accordingly, it is possible to accurately know the rotation variation, slipping state, and the like due to change in the driving state or the state of the road surface.

Figure 12:
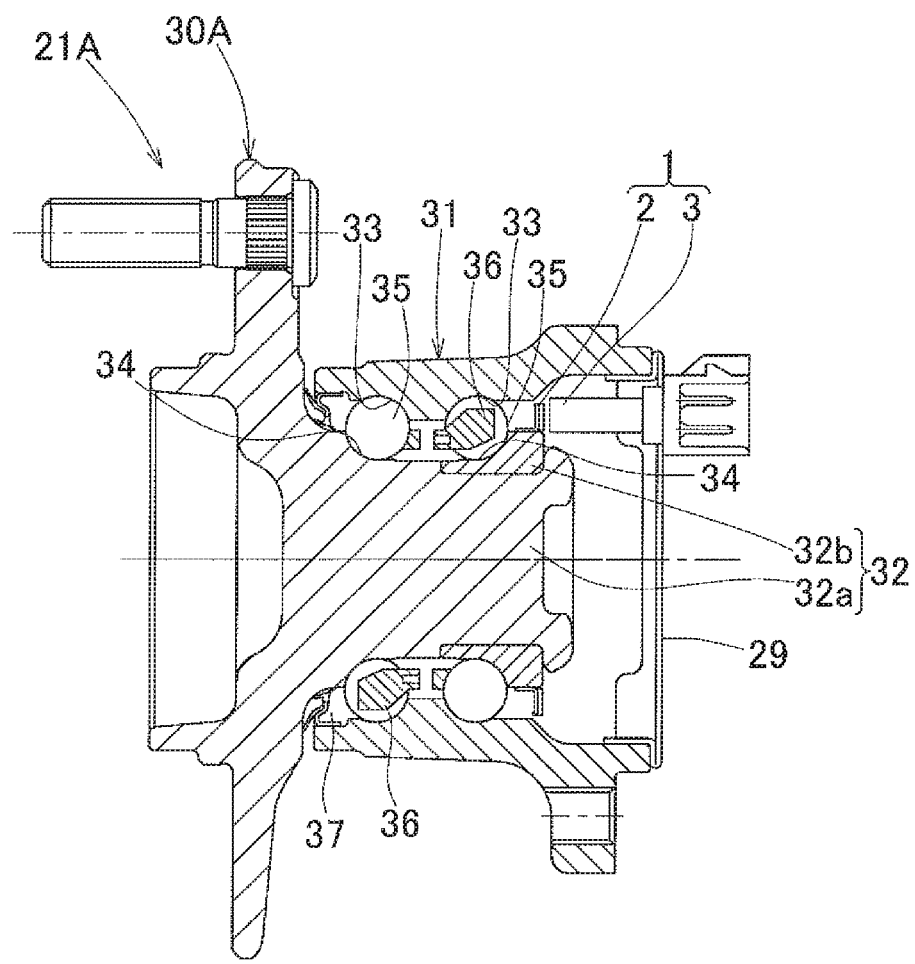
FIG. 12 is a cross-sectional view showing another configuration example of the rotation detection device-equipped bearing unit in which the rotation detection device according to the present invention is mounted.
Figure 13:
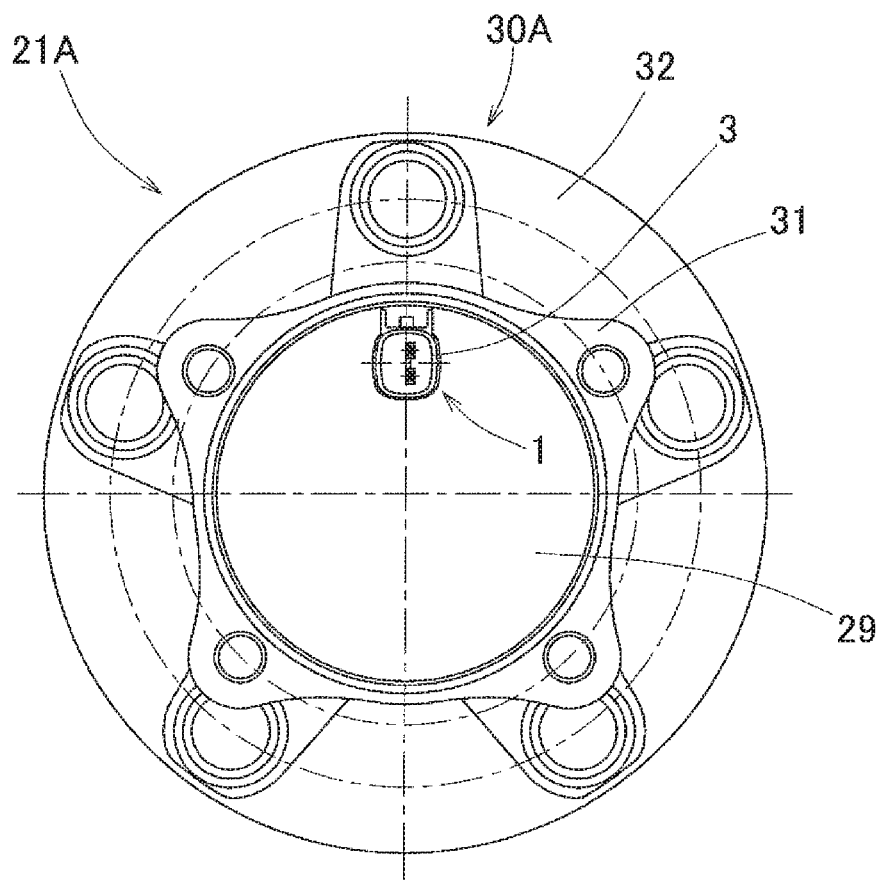
FIG. 13 is a side view of the rotation detection device-equipped bearing unit, viewed from the inboard side.

FIG. 12 and FIG. 13 show another configuration example of the rotation detection device-equipped bearing unit in which the rotation detection device 1 having the above configuration is mounted to a bearing for automotive wheel. This rotation detection device-equipped bearing unit 21A is of a third-generation inner ring rotation type in which the rotation detection device 1 of an axial type is mounted to a wheel bearing 30A for supporting a driven wheel. In this configuration example, the end face opening at the inboard side end of the outer member 31 of the wheel bearing 30A is covered by a cover 29, and the sensor 3 of the rotation detection device 1 is mounted to this cover 29. The other configurations and effects are the same as those of the rotation detection device-equipped bearing unit 21 shown in FIG. 10 and FIG. 11.

Figure 14:
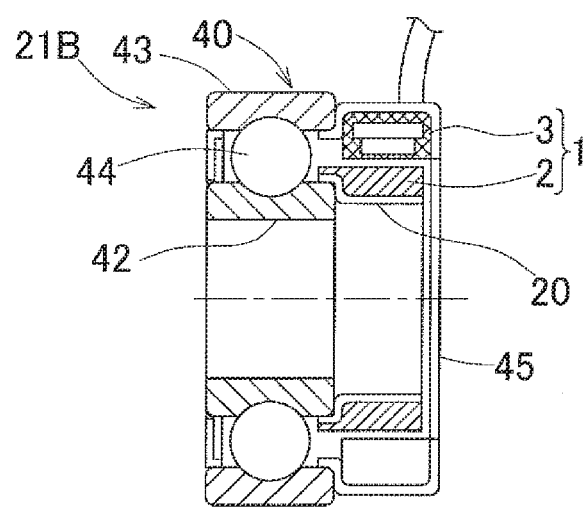
FIG. 14 is a cross-sectional view showing still another configuration example of the rotation detection device-equipped bearing unit in which the rotation detection device according to the present invention is mounted.

FIG. 14 shows a configuration example of a rotation detection device-equipped bearing unit 21B in which the rotation detection device 1 described above is mounted to a general bearing. The rotation detection device-equipped bearing unit 21B is configured such that: in a bearing 40 having a rotation-side bearing ring 42 and a fixed-side bearing ring 43 which are rotatable relative to each other via rolling elements 44, the encoder 2 of the rotation detection device 1 of a radial type is mounted to one end of the rotation-side bearing ring 42, and the sensor 3 of the rotation detection device 1 is mounted to one end of the fixed-side bearing ring 43 so as to face the encoder 2 in the radial direction. The bearing 40 is a deep groove ball bearing, and the inner ring thereof serves as the rotation-side bearing ring 42 and the outer ring thereof serves as the fixed-side bearing ring 43.

The encoder 2 is a magnetic encoder in which magnetic pole pairs are arranged and magnetized in the circumferential direction on the outer peripheral surface of the back metal 20 having a ring shape. The encoder 2 is fixed to the rotation-side bearing ring 42 via the back metal 20. The sensor 3 is provided through resin molding in a metal case 45 having a ring shape, and is fixed to the fixed-side bearing ring 43 via the metal case 45.

Thus, in the rotation detection device-equipped bearing unit 21B having mounted therein the rotation detection device 1 having the above configuration, it is possible to avoid influence of change in signals due to variation and the like of the mounting position of the sensor and deformation and the like of the mounted members, and to accurately detect the rotational speed and the rotational position of the rotating shaft.

Figure 15:
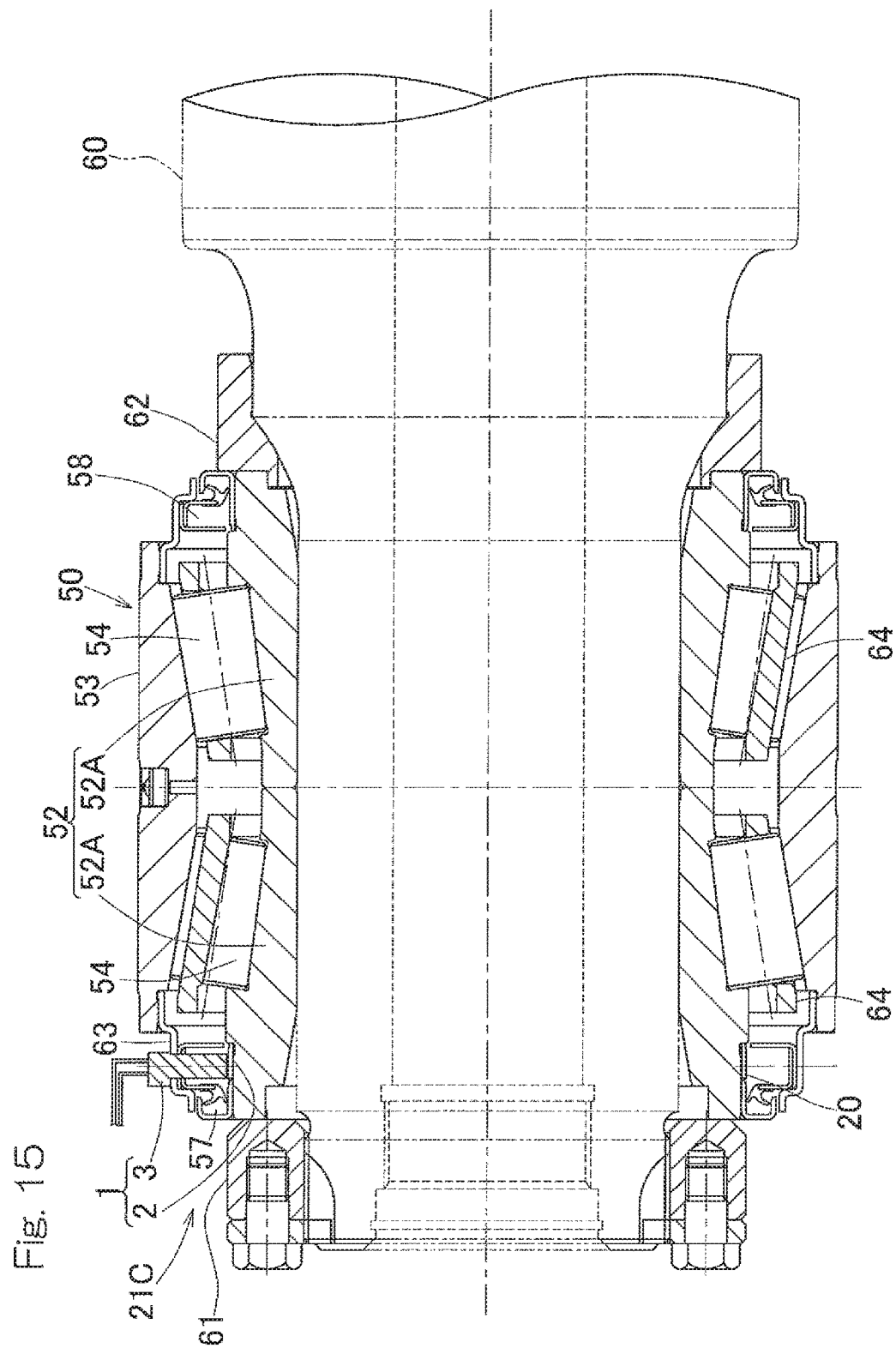
FIG. 15 is a cross-sectional view showing still another configuration example of the rotation detection device-equipped bearing unit in which the rotation detection device according to the present invention is mounted.

FIG. 15 shows a configuration example of a rotation detection device-equipped bearing unit in which the rotation detection device 1 having the above configuration is mounted to an axle bearing of a railroad vehicle. This rotation detection device-equipped bearing unit 21C is configured such that: in an axle bearing 50 of a railroad vehicle having an inner ring 52 and an outer ring 53 which are rotatable relative to each other via rolling elements 54, the encoder 2 of the rotation detection device 1 of a radial type is mounted to one end of the inner ring 52, and the sensor 3 of the rotation detection device 1 is mounted to one end of the outer ring 53 so as to face the encoder 2 in the radial direction.

The axle bearing 50 is of a double row outward-facing tapered roller bearing. The inner ring 52 is composed of two segmented inner rings 52A arranged in the axial direction and coupled to each other. The outer ring 53 is composed of one member. Between the inner ring 52A and the outer ring 53, a plurality of rows of rolling elements 54 are interposed. Each rolling element 54 is formed as a tapered roller, and is retained by a retainer 64. Opposite ends of the bearing space between the inner ring 52 and the outer ring 53 are sealed with seals 57 and 58, respectively. The inner ring 52 is fixed to the axle 60 by a rear cap 62 and a front cap 61 which are disposed at opposite ends of the inner ring 52 and fitted to the axle 60.

The encoder 2 is a magnetic encoder in which magnetic pole pairs are arranged and magnetized in the circumferential direction on the outer peripheral surface of the back metal 20 having a ring shape. The encoder 2 is fixed to the inner ring 52 via the back metal 20. The sensor 3 is mounted in a metal case 63 having a ring shape fitted to one end of the outer ring 53, such that the sensor 3 faces the encoder 2 in the radial direction.

Thus, in the rotation detection device-equipped bearing unit 21C in which the rotation detection device 1 having the above configuration is mounted to the axle bearing 50, it is possible to avoid influence of change in signals due to variation and the like of the mounting position of the sensor 3 and deformation and the like the mounted members, and to accurately detect the rotational speed of the wheel. In addition, it is also possible to accurately perform detection and the like of rotation abnormality. Further, since the absolute angle position can be obtained, the rotation detection device-equipped bearing unit 21C can also be used for providing such information as to where in the rotational position of the axle 60 the abnormality is occurring.

In the above embodiment, the case where the to-be-detected patterns are magnetic pole pairs 2a has been described. However, it is sufficient that the to-be-detected patterns are those that are disposed at equal pitches and can be detected by a sensor, such as striped patterns optically detected or a gear-shaped pattern formed from a magnetic body.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Rotation detection device
2 . . . Encoder
2a . . . Magnetic pole pair (to-be-detected pattern)
3 . . . Sensor
4 . . . Reference pattern storage unit
5 . . . Phase difference detection unit
6 . . . Error correction unit
21 to 21C . . . Rotation detection device-equipped bearing unit
30, 30A . . . Wheel bearing
40 . . . Bearing

What is claimed is:

1. A rotation detection device comprising:
an encoder rotatably provided and having a plurality of to-be-detected patterns cyclically arranged in a circumferential direction;
a sensor configured to detect the to-be-detected patterns of the encoder to generate a pulse signal;
a reference pattern storage unit configured to measure pitch errors included in the to-be-detected patterns prior to detecting the to-be-detected patterns of the encoder and to store the pitch errors as a reference pattern;
a phase difference detection unit configured to determine a pitch error pattern corresponding to one rotation of the to-be-detected patterns from rotation signals representing a plurality of rotations detected by the sensor during detection of the to-be-detected patterns of the encoder, and configured to compare the pitch error pattern with the reference pattern to determine a relative phase difference; and
an error correction unit configured to, based on the phase difference determined by the phase difference detection unit, correct errors included in the rotation signals detected by the sensor.

2. The rotation detection device as claimed in claim 1, wherein each of the reference pattern and the pitch error pattern is obtained through normalization by use of an average value.

3. The rotation detection device as claimed in claim 1, wherein the phase difference detection unit performs correlation calculation while shifting a phase of the reference pattern and a phase of the pitch error pattern relative to each other, to calculate the phase difference.

4. The rotation detection device as claimed in claim 3, wherein the phase difference detection unit calculates the phase difference by performing correlation calculation in which low frequency components equal to or lower than a predetermined frequency included in the reference pattern and the pitch error pattern are excluded and only high frequency components higher than the low frequency components are used.

5. The rotation detection device as claimed in claim 1, wherein the error correction unit includes a pulse counter configured to output, by use of the phase difference obtained by the phase difference detection unit, a Z phase signal as a reference position signal when a current rotation angle of the encoder is a specific angle.

6. The rotation detection device as claimed in claim 1, wherein the error correction unit is further configured to output a status signal indicating that the phase difference is obtained.

7. The rotation detection device as claimed in claim 6, wherein the error correction unit is configured to output a Z phase signal as the status signal, and to wait to output the Z phase signal until the phase difference is obtained.

8. The rotation detection device as claimed in claim 1, wherein the error correction unit is configured to also calculate a corrected rotational speed value of the encoder, based on the phase difference and the reference pattern.

9. The rotation detection device as claimed in claim 1, wherein the phase difference detection unit is configured to perform normalization using an average period of rotation signals detected by the sensor to determine the pitch error pattern corresponding to one rotation, to calculates a normalization correlation value between the pitch error pattern and the reference pattern while shifting data of the pitch error pattern and data of the reference pattern relative to each other, and to judge that the phase difference is obtained when the normalization correlation value is greater than a predetermined threshold value.

10. A rotation detection device-equipped bearing unit comprising:
   a bearing; and
   the rotation detection device as claimed in claim 1 mounted to the bearing.

* * * * *